United States Patent Office 3,806,510
Patented Apr. 23, 1974

3,806,510
4(ORTHOALKYLTHIO PHENYL) PIPERAZIN-1-YL HYDANTOINS
Robert F. Parcell, Ann Arbor, Mich., assignor to Parke, Davis & Company, Detroit, Mich.
No Drawing. Filed Sept. 18, 1972, Ser. No. 289,988
Int. Cl. C07d 51/70
U.S. Cl. 260—268 PH     6 Claims

ABSTRACT OF THE DISCLOSURE

3 - (1-piperazinylalkyl)hydantoin compounds further substituted at the 4-position of the piperazine ring by o-methylthiophenyl, o-ethylthiophenyl, o-propylthiophenyl, or o-isopropylthiophenyl; methyl substitution products; and acid-addition salts. The compounds are pharmacological agents, especially central nervous system depressants of the type known as major tranquilizing agents. They exhibit cerebral depressant activity and suppress conditioned avoidance behavior. They can be produced according to various methods of forming a hydantoin ring, for example by ring closure of an N-carboalkoxyamino acid amide. The unmethylated compounds can also be produced by ring closure of disubstituted ureas. Starting materials can be produced from various piperazine derivatives.

SUMMARY AND DETAILED DESCRIPTION

The present invention relates to new hydantoin compounds. More particularly, the invention relates to new 3 - (1 - piperazinylalkyl)hydantoin compounds further substituted at position 4 of the piperazine ring; to certain methyl substitution products; to salts thereof; and to methods for the production of the foregoing compounds.

In the forms of their free bases, the compounds of the invention can be represented by the formula

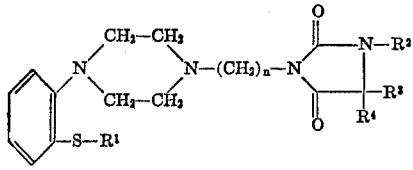

In this formula, $R^1$ represents methyl, ethyl, propyl, or isopyl; each of $R^2$, $R^3$, and $R^4$ represents hydrogen or methyl; and $n$ represents 3, 4, 5, or 6.

In accordance with the invention, the compounds of the invention wherein each of $R^2$, $R^3$, and $R^4$ represents hydrogen (including free base and salt forms) can be produced by heating a disubstituted urea compound of the formula

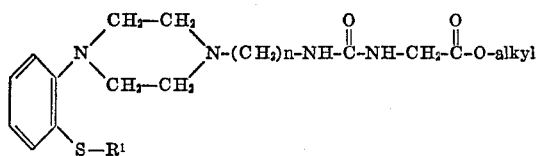

or a salt thereof in the presence of a ring closure agent, whereby cyclization occurs with the formation of the hydantoin ring. In the above formula, $R^1$ and $n$ are as defined before, and alkyl is preferably a lower alkyl radical of not more than 6 carbon atoms and is most conveniently methyl or ethyl. The reaction proceeds with the elimination of an alkanol as cyclization occurs. The ring closure agent can be regarded as having the function of a catalyst. Either strongly acidic or strongly basic ring closure agents can be used. Some examples of suitable acidic agents are mineral acids such as hydrochloric, hydrobromic, sulfuric, and phosphoric acids; and strong organic acids such as p-toluenesulfonic and methanesulfonic acids. Some examples of suitable basic agents are sodium hydride, potassium tertbutoxide, and sodium amide. An acidic agent such as hydrochloric acid or other mineral acid is preferred, in which case a recommended solvent is water or an aqueous lower alkanol. According to the preferred method of carrying out this process, the disubstituted urea compound employed as starting material is formed in situ in a non-aqueous organic solvent such as toluene and is not isolated; an aqueous acidic ring closure agent such as hydrochloric acid is added and while the reaction proceeds under the influence of heat, the non-aqueous organic solvent is allowed to evaporate from the reaction mixture. When a basic ring closure agent is used, a preferred solvent is a non-aqueous, unreactive organic solvent such as toluene or xylene. The time and temperature of the reaction are not especially critical and the usual conditions are a temperature of from 50 to 150° C. or the reflux temperature of the solvent for from one to 24 hours, with a temperature of 70–110° C. and a reaction time of 3 to 5 hours being preferred. The product is isolated as an acid-addition salt or as a free base following adjustment of the pH as necessary.

Disubstituted urea compounds required as starting materials in the foregoing process can be prepared by any of a variety of methods. For example, a 1-(aminoalkyl) 4-(o - alkylthiophenyl)piperazine compound of the formula

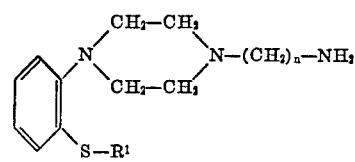

is reacted with an isocyanatoacetic acid, alkyl ester of the formula

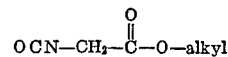

The resulting disubstituted urea compound formed in this reaction is preferably used in situ and without isolation as the starting material in the foregoing process for reaction with the strongly acidic or strongly basic agent. However, the disubstituted urea compound can first be isolated if desired. The 1-(aminoalkyl) - 4 - (o-alkylthiophenyl)piperazine compounds of the above formula can be produced by reacting a 1-(o-alkylthiophenyl)piperazine of the formula

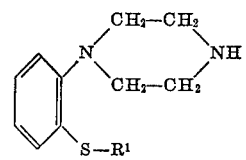

with a bromonitrile of the formula

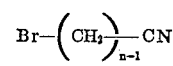

in the presence of potassium carbonate and reducing the product by reaction with lithium aluminum hydride followed by hydrolysis of the reaction mixture. Acrylonitrile can be substituted for the bromonitrile in the foregoing reaction sequence to produce the compounds wherein $n$ is 3. In the above formulas $R^1$, $n$, and alkyl have the meanings given before.

Also in accordance with the invention, the compounds of the invention (including free base and salt forms) can be produced by heating an N-carboalkoxyamino acid amide of the formula

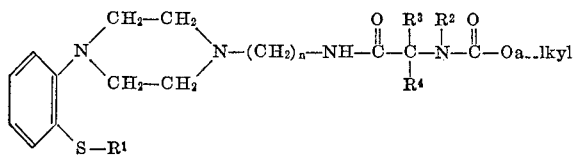

or a salt thereof in the presence of a ring closure agent, whereby cyclization occurs with the formation of the hydantoin ring. In the above formula, $R^1$, $R^2$, $R^3$, $R^4$, and $n$ are as defined before, and alkyl is preferably a lower alkyl radical of not more than 6 carbon atoms and is most conveniently methyl or ethyl. The reaction proceeds with the elimination of an alkanol as cyclization occurs. The ring closure agent can be regarded as having the function of a catalyst. Either strongly acidic or strongly basic ring closure agents can be used. Some examples of suitable acidic agents are mineral acids such as hydrochloric, hydrobromic, sulfuric, and phosphoric acids; and strong organic acids such as p-toluenesulfonic and methanesulfonic acids. Some examples of suitable basic agents are sodium hydride, potassium tert-butoxide, and sodium amide. A basic agent such as sodium hydride is preferred, in which case a suitable solvent is a non-aqueous, unreactive organic solvent such as toluene or xylene. According to the preferred method of carrying out this process, the N-carboalkoxyamino acid amide employed as starting material is formed in situ and is not isolated. A ring closure agent of one of the types described is added (if not already present) and the process is carried out by heating the reaction mixture. The time and temperature of the reaction are not especially critical and the usual conditions are a temperature of from 70 to 150° C. or the reflux temperature of the solvent for from one to 12 hours. It is preferred to remove the alkanol formed as a by-product as the reaction proceeds, and to continue heating the reaction mixture for an additional 30 minutes to 3 hours after the theoretical amount of the alkanol has been collected. The product is isolated as an acid-addition salt or as a free base following adjustment of the pH as necessary.

N-carboalkoxyamino acid amides required as starting materials in the foregoing process can be prepared by any of a variety of methods. For example, a 1-(aminoalkyl)-4-(o-alkylthiophenyl)piperazine compound of the formula

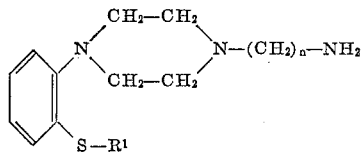

is reacted with a dicarboxylic acid derivative of the formula

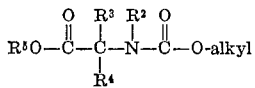

with the use of heat or a condensing agent such as sodium hydride; where $R^5$ represents hydrogen or alkyl. The resulting N-carboalkoxyamino acid amide compound formed in this reaction is preferably used in situ and without isolation as starting material for further reaction with the strongly acidic or strongly basic agent according to the process of the invention. However, the N-carboalkoxyamino acid amide compound can first be isolated if desired. The dicarboxylic acid derivative of the formula given above can be produced by reacting an amino acid ester of the formula

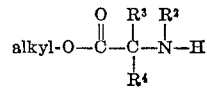

with an alkyl chloroformate of the formula

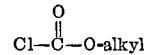

in the presence of a tertiary amine. This produces the dicarboxylic acid derivative wherein $R^5$ represents alkyl and, if desired, it can be converted to the corresponding dicarboxylic acid derivative wherein $R^5$ represents hydrogen by partial hydrolysis with an aqueous base and acidification. These procedures are illustrated in greater detail hereinafter. In the above formulas $R^1$, $R^2$, $R^3$, $R^4$, $n$, and alkyl have the meanings given before.

The free bases of the invention form acid-addition salts with any of a variety of organic and inorganic acids. Pharmaceutically-acceptable acid-addition salts are formed with such acids as hydrochloric, hydrobromic, sulfuric, nitric, phosphoric, acetic, citric, tartaric, succinic, salicylic, maleic, malic, lactic, gluconic, and pamoic acids. In most cases, salts with one equivalent of acid are stable chemical derivatives. The free bases and their salt forms are interconvertible by adjustment of the pH. The free bases are produced by basification and the acid-addition salts are produced by acidification. They differ in solubility properties but, in general, are otherwise equivalent for the purposes of the invention.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds of value as pharmacological agents and especially as central nervous system depressants. For example, they are cerebral depressant agents capable of suppressing motor activity. In the applicable test, the motor activity of rats is measured by placing each of a group of rats in a small wire cage suspended from a long, flexible, spiral spring in such a manner that it moves up and down in response to each movement or change in balance of the animal. The motion of each rat is cumulatively recorded. Treatment of a rat with desoxyephedrine alone causes an increase in motor activity and a resulting increase in the movement of the cage. In carrying out the procedure, a test compound is given by the subcutaneous or oral route and 15 minutes later a standard dose of desoxyephedrine, 2.4 mg./kg., is given subcutaneously. The rats are immediately placed in the cages and left for 2 hours. The effectiveness of a test compound as a cerebral depressant is rated according to the following scale in which percentages are percent suppression of desoxyephedrine-induced activity: 1+=15–30%; 2+=30–50%; 3+=50–75%; 4+=more than 75%. Some results obtained for representative preferred compounds of the invention are as follows. 3-[4-[4-[o-(propylthio)phenyl]-1-piperazinyl]butyl]hydantoin monohydrochloride; 4+ at 1.5 mg./kg., subcutaneous administration; 4+ at 6 mg./kg., oral administration. 3-[6-[4-[o-(propylthio)phenyl]-1-piperazinyl]hexyl]hydantoin monohydrochloride; 4+ at 3 mg./kg., subcutaneous administration; 4+ at 6 mg./kg., oral administration. 1-methyl - 3 - [4-[4-[o-(propylthio)-phenyl] - 1 - piperazinyl]butyl]hydantoin monohydrochloride; 4+ at 0.75 mg./kg., subcutaneous or oral administration.

Another way in which the central nervous system depressant activity of the compounds of the invention can be demonstrated is by measuring their ability to suppress an avoidance behavior to which test animals have been conditioned. Activity in this type of test correlates with so-called major tranquilizer or anti-psychotic activity. Rats are trained to leave a test chamber in order to avoid an electrical shock delivered to the floor of the chamber. A compound is considered to be active in this test if it suppresses the conditioned behavior of the trained rats to leave the chamber before the electrical shock is delivered. In general, the compounds of the invention exhibit a good level of activity (median effective dose) in this test at dosages of one (or somewhat less) to 5 mg./kg., intraperitoneal route. The known agent, chlorpromazine, is also effective in that dosage range, although most compounds of the invention are somewhat more active than chlorpromazine. A preferred compound of the invention, 1 - methyl - 3-[4-[4-[o-(propylthio)phenyl]-1-piperazinyl]butyl]hydantoin monohydrochloride, exhibited a median effective dose of 0.6 mg./kg.

The invention is illustrated by the following examples.

EXAMPLE 1

A solution of N-[[4-[4-[o-(propylthio)phenyl]-1-piperazinyl]butyl]carbamoyl]glycine, ethyl ester is prepared in situ as follows. A solution of 30.7 g. of 1-(4-aminobutyl) - 4 - (o-propylthiophenyl)piperazine in 100 ml. of toluene is treated with 14.2 g. of ethyl isocyanatoacetate. After a mild exothermic reaction has subsided, the solution is heated at 90–100° C. for 30 minutes. The resulting solution containing N-[[4-[4-[o-(propylthio)-phenyl] - 1 - piperazinyl]butyl]carbamoyl]glycine, ethyl ester is treated with 200 ml. of 20% hydrochloric acid and the mixture is stirred and heated at 90–100° C. for 4 hours, allowing the toluene to evaporate. The remaining mixture is evaporated under reduced pressure and the residue is dissolved in 400 ml. of 1:1 ethanol-benzene. The solution is evaporated to dryness under reduced pressure to remove the last traces of water and the residue is dissolved in methanol and the solution treated with excess ethylene oxide to remove any hydrogen chloride present in excess of one equivalent. The solution is then evaporated to dryness under reduced pressure to give 3-[4-[4-[o-(propylthio)phenyl] - 1 - piperazinyl]butyl]hydantoin monohydrochloride: M.P. 204–206° C. after crystallization from methanol-isopropyl alcohol. The following additional products are produced similarly.

From N-[[3-[4 - [o-(propylthio)phenyl] - 1 - piperazinyl]propyl]carbamoyl]glycine, ethyl ester (prepared in situ from 29.3 g. of 1-(3-aminopropyl)-4-(o-propylthiophenyl)piperazine and 14.2 g. of ethyl isocyanatoacetate), the product is 3-[3-[4-[o-(propylthio)phenyl]-1 - piperazinyl]propyl]hydantoin monohydrochloride; M.P. 203–205° C. after crystallization from ethanol.

From N - [[5 - [4 - [o-(propylthio)phenyl]-1-piperazinyl]pentyl]carbamoyl]glycine, ethyl ester (prepared in situ from 32.1 g. of 1-(5-aminopentyl)-4-(o-propylthiophenyl)piperazine and 14.2 g. of ethyl isocyanatoacetate), the product is 3-[5-[4-[o-(propylthio)phenyl]-1-piperazinyl]pentyl]hydantoin monohydrochloride; M.P. 178–180° C. after crystallization from isopropyl alcohol.

From N-[[6-[4-[o-(propylthio)phenyl]-1-piperazinyl]hexyyl]carbamoyl]glycine, ethyl ester (prepared in situ from 33.5 g. of 1-(6-aminohexyl)-4-(o-propylthiophenyl)piperazine and 14.2 g. of ethyl isocyanatoacetate), the product is 3-[6-[4-[o-(propylthio)phenyl]-1-piperazinyl]hexyl]hydantoin monohydrochloride; M.P. 139–141° C. after crystallization from isopropyl alcohol.

From N-[[4-[4-[o-(isopropylthio)phenyl] - 1 - piperazinyl]butyl]carbamoyl]glycine, ethyl ester (prepared in situ from 30.7 g. of 1-(4-aminobutyl)-4-(o-isopropylthiophenyl)piperazine and 14.2 g. of ethyl isocyanatoacetate), the product is 3-[4-[4-[o-(isopropylthio)phenyl] - 1-piperazinyl]butyl]hydantoin monohydrochloride; M.P. 198–201° C. after crystallization from isopropyl alcohol.

From N-[[4-[4-[o-(ethylthio)phenyl - 1 - piperazinyl]butyl]carbamoyl]glycine, ethyl ester (prepared in situ from 29.3 g. of 1-(4-aminobutyl)-4-(o-ethylthiophenyl)piperazine and 14.2 g. of ethyl isocyanatoacetate), the product is 3-[4-[4-[o-(ethylthio)phenyl]-1-piperazinyl]butyl]hydantoin monohydrochloride; M.P. 201–203° C. after crystallization from methanol-ether.

From N-[[4-[4-[o-(methylthio)phenyl]-1-piperazinyl]butyl]carbamoyl]glycine, ethyl ester (prepared in situ from 27.9 g. of 1-(4-aminobutyl)-4-(o-methylthiophenyl)piperazine and 14.2 g. of ethyl isocyanatoacetate), the product is 3-[4-[4-[-o(methylthio)phenyl]-1-piperazinyl]butyl]hydantoin monohydrochloride; M.P. 216–219° C. after crystallization from ethanol-ether.

From N-[[3 - [4-[o-(ethylthio)phenyl]-1-piperazinyl]propyl]carbamoyl]glycine, ethyl ester (prepared in situ from 27.9 g. of 1-(3-aminopropyl)-4-(o-ethylthiophenyl)piperazine and 14.2 g. of ethyl isocyanatoacetate), the product is 3-[3-[4-[o-(ethylthio)phenyl]-1-piperazinyl]propyl]hydantoin monohydrochloride; M.P. 233–235° C. after crystallization from ethanol-isopropyl alcohol.

Each of the above monohydrochloride salts is converted to the free base by reaction with a base such as aqueous sodium hydroxide, potassium carbonate, or potassium bicarbonate. Each free base is converted to citrate and maleate salts by reaction in methanol with, respectively, citric acid and maleic acid.

EXAMPLE 2

A reaction mixture in which 2-(N-carbethoxyamino)-N-[4-[4-[o-(propylthio)phenyl] - 1 - piperazinyl]butyl]propionamide is formed in situ as an unisolated starting material and then undergoes further reaction, is prepared as follows. A mixture of 15.4 g. of 1-(4-aminobutyl)-4-(o-propylthiophenyl)piperazine, 9.5 g. of N-carbethoxyalanine, ethyl ester, 0.5 g. of a 50% dispersion of sodium hydride in mineral oil, and 60 ml. of xylene is heated at the boiling point under a short fractionating column with a distilling head that permits partial reflux along with removal of the ethanol formed in the reaction. Ethanol is distilled off at 75–80° C. as formed until the theoretical amount (approximately 6 ml.) is collected. This requires approximately 2 hours. The reaction mixture is then heated under reflux for 30 minutes, cooled, and neutralized by the addition of solid carbon dioxide. The solution is washed with water, dried, and evaporated under reduced pressure to give a residue of 5-methyl-3-[4-[4-[o - (propylthio)phenyl] - 1 - piperazinyl]butyl]hydantoin. This free base is dissolved in methanol and a slight excess of hydrogen chloride is added. Excess ethylene oxide is then added to remove any hydrogen chloride in excess of one equivalent. The solution is evaporated to dryness to give the monohydrochloride salt; M.P. 143–149° C. after crystallization from dioxane (product obtained as a solvate with dioxane).

EXAMPLE 3

By following the general procedure of the foregoing example, 2 - (N-carbethoxyamino)-2-methyl-N-[4-[4-[o-(propylthio)phenyl]-1-piperazinyl]butyl]propionamide is formed in situ as an unisolated starting material, from the reaction of 15.4 g. of 1-(4-aminobutyl)-4-(o-propylthiophenyl)piperazine, 10.7 g. of N-carbethoxy-α-aminoisobutyric acid, ethyl ester, 0.5 g. of a 50% dispersion of sodium hydride in mineral oil, and 60 ml. of xylene. Concurrently, reaction of the starting material as formed, with the sodium hydride, and isolation of product, gives 5,5 - dimethyl - 3 - [4 - [4 - [o - (propylthio)phenyl]-1-piperazinyl]butyl]hydantoin. The monohydrochloride salt is prepared as described in the preceding example; M.P. 208–210° C. after crystallization from isopropyl alcohol.

EXAMPLE 4

A reaction mixture in which 2-(N-carbethoxy-N-methylamino) - N - [4 - [4 - [o - (propylthio)phenyl] - 1-piperazinyl]butyl]acetamide is formed in situ as an unisolated starting material is prepared as follows. A solution of 15.4 g. of 1-(4-aminobutyl)-4-(o-propylthiophenyl)piperazine and 8.05 g. of N-carbethoxysarcosine in 60 ml. of xylene is heated under partial reflux with continuous removal of the water formed in the reaction until the theoretical amount of water (approximately 0.9 ml.) has been collected. The resulting solution which contains the starting material identified above is treated with 0.5 g. of a 50% sodium hydride dispersion in mineral oil and then heated at the boiling point under a short fractionating column with a distilling head that permits partial reflux along with removal of the ethanol formed in the reaction. Ethanol is removed by distillation until the theoretical amount (approximately 3 ml.) has been collected. The reaction mixture is then heated at reflux for 3 hours, cooled, and neutralized by the addition of solid carbon dioxide. The solution is washed with water, dried, and evaporated under reduced pressure to give a residue of 1-methyl - 3 - [4-[4-[o-(propylthio)phenyl]-1-piperazinyl]butyl]hydantoin. This free base is dissolved in isopropyl alcohol and one equivalent of dry hydrogen chloride and then excess dry ether are added. The insoluble product is collected on a filter and washed with ether. It is the monohydrochloride salt; M.P. 165–169° C. following crystallization from ethanol. The free base is converted to citrate, tartrate, and phosphate salts by reaction with, respectively, citric acid, tartaric acid, and phosphoric acid.

STARTING MATERIALS

The preparation for some of the starting materials has been described in the examples to which they pertain. Other starting materials and intermediates can be prepared as described below.

A mixture of 236 g. of 1-(o-propylthiophenyl)piperazine, 155 g. of 4-bromobutyronitrile, 200 g. of anhydrous potassium carbonate, and 800 ml. of 2-butanone is stirred and heated at reflux for 16 hours, then cooled and filtered. The filtrate is evaporated under reduced pressure and the residue is dissolved in one liter of ether. The ether solution, containing 4-(o-propylthiophenyl)-1-piperazinebutyronitrile, is washed with water, dried thoroughly, and added slowly to a stirred slurry of 42 g. of lithium aluminum hydride in 2 liters of ether. The resulting mixture is stirred and heated at reflux for 4 hours, then cooled, and treated successively with 44 ml. of water, 33 ml. of 20% aqueous sodium hydroxide, and 157 ml. of water. The mixture is filtered and the filtrate evaporated to give a residue of 1-(4-aminobutyl)-4-(o-propylthiophenyl)piperazine as an oil which is purified by distillation under reduced pressure; B.P. 158–163° C. at 0.08 mm. The following additional products are obtained by making the indicated substitutions in the foregoing procedure. From 236 g. of 1-(o-isopropylthiophenyl)piperazine, the product is 1-(4-aminobutyl)-4-(o-isopropylthiophenyl)piperazine; B.P. 170–172° C. at 0.4 mm. From 222 g. of 1-(o-ethylthiophenyl)piperazine, the product is 1-(4-aminobutyl)-4-(o-ethylthiophenyl)piperazine; B.P. 150–152° C. at 0.1 mm. From 236 g. of 1-(o-propylthiophenyl)piperazine and 185 g. of 6-bromohexanenitrile (6-bromocapronitrile), the product is 1-(6-aminohexyl)-4-(o-propylthiophenyl)piperazine; B.P. 176–180° C. at 0.1 mm.

A mixture of 41.6 g. of 1-(o-methylthiophenyl)piperazine, 32.6 g. of 4-bromobutyronitrile, 42 g. of anhydrous potassium carbonate, and 400 ml. of acetone is stirred and heated at reflux for 18 hours, then cooled, and filtered. The filtrate is evaporated under reduced pressure and the residue is dissolved in 300 ml. of toluene. The toluene solution is treated with charcoal, filtered, and evaporated at reduced pressure to give a residue of 4-(o-methylthiophenyl)-1-piperazinebutyronitrile. This nitrile is dissolved in 300 ml. of tetrahydrofuran and the solution is added slowly to a stirred slurry of 12 g. of lithium aluminum hydride in one liter of dry ether. The resulting mixture is stirred and heated at reflux for 6 hours, then cooled, and treated successively with 13 ml. of water, 9.5 ml. of 20% aqueous sodium hydroxide, and 44 ml. of water. The mixture is filtered and the filtrate evaporated to give a residue of 1-(4-aminobutyl)-4-(o-methylthiophenyl)piperazine; B.P. 135–139° C. at 0.1 mm.

An intimate mixture of 12 g. of acrylonitrile and 44 g. of 1-(o-ethylthiophenyl)piperazine is allowed to stand for 16 hours at room temperature. The resulting product, 4-(o-ethylthiophenyl) - 1 - piperazinepropionitrile, is dissolved in 200 ml. of dry ether and the solution is added slowly to a stirred slurry of 12 g. of lithium aluminum hydride in one liter of dry ether. The resulting mixture is stirred at room temperature for 18 hours, then treated successively with 13 ml. of water, 9.5 ml. of 20% aqueous sodium hydroxide, and 44 ml. of water. The mixture is filtered and the filtrate evaporated to give a residue of 1-(3-aminopropyl)-4-(o-ethylthiophenyl)piperazine; B.P. 152–153° C. at 0.1 mm.

A solution of 156 g. of α-aminoisobutyric acid, ethyl ester, hydrochloride, in 1500 ml. of dichloromethane is cooled to —20° C. and then treated, while stirring and cooling to —20 to —30° C. with 195 g. of triethylamine, followed by a solution of 106 g. of ethyl chloroformate in 300 ml. of dichloromethane. Stirring is continued while the reaction mixture is allowed to warm to room temperature. The mixture is filtered and the filtrate evaporated under reduced pressure. The residue is extracted with 800 ml. of dry ether and the mixture is filtered. The filtrate is evaporated to give a residue of N-carbethoxy-α-aminoisobutyric acid, ethyl ester; B.P. 64–74° C. at 0.15 mm. Similarly, by substituting 143 g. of sarcosine, ethyl ester, hydrochloride, for the α-aminoisobutyric acid, ethyl ester, hydrochloride, the product obtained is N-carbethoxysarcosine, ethyl ester; B.P. 102–108° C. at 0.1 mm.

A solution of 189 g. of N-carbethoxysarcosine, ethyl ester, in 100 ml. of water and 300 ml. of methanol is stirred and heated at 55–60° C. while 25% sodium hydroxide solution is added as needed to attain and maintain a pH of 11±0.5. When the pH is stabilized at this point without need for further addition of alkali, the solution is cooled, neutralized to pH 7 with hydrochloric acid, and the methanol evaporated under reduced pressure. The residue is diluted to a volume of 500 ml. with water and the mixture adjusted to pH 1 with hydrochloric acid and extracted with ether. The ether extract is washed with water, dried, and evaporated to give a residue of N-carbethoxysarcosine; B.P. 106–107° C. at 0.1 mm.

What is claimed is:

1. A member of the class consisting of compounds of the formula

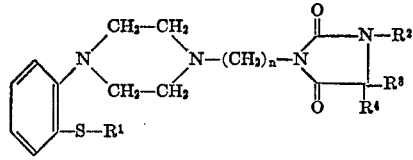

and pharmaceutically-acceptable acid-addition salts thereof; where $R^1$ represents methyl, ethyl, propyl, or isopropyl; each of $R^2$, $R^3$, and $R^4$ represents hydrogen or methyl; and $n$ represents 3, 4, 5, or 6.

2. The compound according to claim 1 which is a pharmaceutically-acceptable acid-addition salt of 3-[4-[4-[o-(propylthio)phenyl] - 1 - piperazinyl]butyl]hydantoin.

3. The compound according to claim 1 which is a pharmaceutically-acceptable acid-addition salt of 3-[6-[4-[o-(propylthio)phenyl] - 1 - piperazinyl]hexyl]hydantoin.

4. The compound according to claim 1 which is a pharmaceutically-acceptable acid-addition salt of 1-methyl - 3-[4-[4-[o-(propylthio)phenyl]-1-piperazinyl]butyl]hydantoin.

5. The compound according to claim 4 which is 1-methyl-3-[4-[4-[o-(propylthio)phenyl] - 1 - piperazinyl] butyl]hydantoin monohydrochloride.

6. The compound according to claim 1 which is 1-methyl-3-[4-[4-[o-(propylthio)phenyl] - 1 - piperazinyl] butyl]hydantoin.

References Cited

UNITED STATES PATENTS

| | | | |
|---|---|---|---|
| 2,836,595 | 5/1958 | Parcell | 260—268 PH |
| 3,007,928 | 11/1961 | Parcell | 260—268 PH |
| 3,037,024 | 5/1962 | Parcell | 260—268 PH |
| 3,374,237 | 3/1968 | Wright | 260—268 PH |
| 3,398,151 | 8/1968 | Wu | 260—268 PH |
| 3,541,098 | 11/1970 | Mennear | 260—268 PH |
| 3,576,808 | 4/1971 | Schut | 260—268 PH |

DONALD G. DAUS, Primary Examiner

U.S. Cl. X.R.

424—250

UNITED STATES PATENT OFFICE
CERTIFICATE OF CORRECTION

Patent No. 3,806,510    Dated April 23, 1974

Inventor(s) ROBERT F. PARCELL

It is certified that error appears in the above-identified patent and that said Letters Patent are hereby corrected as shown below:

The title should read:

"3-[4-(Orthoalkylthiophenyl)piperazin-1-ylalkyl]hydantoins"

Signed and sealed this 1st day of October 1974.

(SEAL)
Attest:

McCOY M. GIBSON JR.
Attesting Officer

C. MARSHALL DANN
Commissioner of Patents